UNITED STATES PATENT OFFICE 2,165,486

INSECTICIDE AND METHOD FOR ITS PREPARATION

Paul W. Jewel and William E. Bradley, Los Angeles, Calif., assignors to Union Oil Company of California, Los Angeles, Calif., a corporation of California No Drawing. Application November 21, 1933, Serial No. 699,034. Renewed December 5, 1938

6 Claims. (Cl. 167—43)

The present invention relates to improvements in insecticides, and more particularly it pertains to insecticides and fungicides suitable for the treatment of gardens, vineyards, orchards, etc. for the purpose of destroying insects as well as fungoid pests.

Generally, an oil base insecticide contains a toxic agent for the extermination of insects or fungoid pests, a spray oil, water, and an emulsifying agent which may or may not also act as a wetting agent. One of the most important requirements of a proper garden insecticide resides in the incorporation into such an insecticide of a suitable wetting, spreading, and/or penetrating agent. This is due to the fact that the insect exterminating compound and the spray oil or solvent therefor when emulsified with water do not usually have wetting and spreading properties sufficient to distribute themselves in the form of a thin film over the leaves or other parts of a plant. Furthermore, many plants upon which sprays are used have water-repellant surfaces which cannot be wetted by aqueous liquids, so that the spraying thereof with many liquid insecticides used at the present time has failed to produce the desired effect. It has therefore been customary to incorporate into an insecticide compound a wetting and spreading agent which would permit the toxic agent to spread as a thin film over the foliage. However, not every wetting and spreading agent is satisfactory for said purpose in view of the fact that some of them are not stable while others do not have sufficient wetting and spreading action for the particular toxic or insect-exterminating agent, for example nicotine as such, or in the form of tobacco juice (nicotine plus essential oils and resins from tobacco) or other nicotine-containing extracts, or the like.

It is therefore an object of this invention to provide an insecticide compound containing an agent or agents having superior wetting properties for the particular toxic compound contained in said insecticide.

It is a further object of the present invention to provide a garden insecticide containing a wetting, penetrating, and/or spreading agent which is stable under conditions of use.

We have found that insecticide compounds or emulsions should be transparent in order to have the above-mentioned qualifications as to stability and high wetting, penetrating and spreading properties. This is apparently due to the fact that such transparent solutions are uniform in structure, and have a lesser tendency to break down into their components.

It is therefore a still further object of the present invention to provide an insecticide in the form of a transparent emulsion or solution, thereby obtaining an insecticide spray which is stable under conditions of use, and uniform in structure with high wetting, spreading and penetrating actions.

With these ends in view and in accordance with the present invention, the invention broadly stated resides in an improved composition which comprises a mineral oil, an oil dispersible nicotine derivative (which in itself also serves as an emulsifying agent), an additional emulsifying agent of the soap type, and a wetting or spreading agent or agents satisfactory for wetting of the foliage and the spreading of the nicotine derivative thereon.

More particularly stated, the invention resides in the use of nicotine salts of higher fatty acids as the toxic or insect-exterminating agent, and of agents suitable for the dispersion of the compound containing such nicotine salts, as well as of the mineral oil, water and emulsifying agent, over the surface of the foliage to be treated. The nicotine salts are preferably salts of the higher fatty acids starting with caprylic acid and ranging through oleic, palmitic, stearic and behenic acids. Also, the nicotine salts of the coconut oil fatty acids may be used. However, it has been found that very good results are obtainable by employing nicotine oleate produced by the reaction of nicotine and oleic acid.

This compound produces transparent emulsions which are uniform in structure, have low surface tension, and exhibit only slight tendency to break down.

Research has now disclosed that the higher monohydric alcohols, cyclic alcohols and polyhydric alcohols, in combination with sulfonated derivatives of fatty acids, and especially of the higher fatty acids, are especially suitable as spreading or dispersing agents for an insecticide containing nicotine salts of higher fatty acids, for example nicotine oleate. It has been further discovered that cyclohexanol, particularly when used in conjunction with sulfonated oleic acid, has a decidedly superior wetting and spreading action. This is due to the fact that such incorporation of the cyclohexanol, or any one of the equivalent alcohols mentioned below, and of a sulfonated derivative of the higher fatty acids such as sulfonated oleic acid, into an insecticide containing nicotine oleate, mineral oil, an emulsifying agent and water, produces a transparent solution or emulsion which has all of the desired qualifications and characteristics stated above.

It may therefore be stated that the present invention further resides in a garden insecticide containing nicotine oleate, a mineral oil, water, an emulsifying agent of the soap type, and wetting or spreading agents suitable for nicotine oleate, and preferably consisting of the higher monohydric, cyclic and/or polyhydric alcohols in conjunction with the sulfonated derivatives of the higher fatty acids. The invention still further resides in a method for the preparation of such stable and transparent insecticides.

Experiments have further shown that for the purpose of obtaining transparency it is essential that both the sulfonated fatty acid and one or more of the higher alcohols be present in the insecticide compound. Thus, the elimination of the sulfonated fatty acid from the insecticide compound produces a milky or clouded emulsion which does not have the desired wetting and dispersing actions.

Although, as stated above, it is preferred to use a mixture of cyclohexanol and sulfonated oleic acid as the spreading agents for the insecticides containing nicotine derivatives or salts of the higher fatty acids, certain other compounds may be substituted for the cyclohexanol without markedly affecting or altering the spreading or wetting action of the diluted spray. Among such substitutes for the cyclohexanol one may name secondary butyl alcohol, glycols, and monomethyl, ethyl or butyl ethers of mono- or diethylene glycols.

Instead of using nicotine oleate per se it is possible to use chemically pure nicotine and oleic acid since the two compounds when brought together and allowed to react have the same characteristics as nicotine oleate. Also, "Black leaf 50" may be used instead of the nicotine alkaloid. This compound consists of the essential or volatile oils from tobacco, and contains about 50% of nicotine alkaloid. The rest of this compound consists of volatile oils and resins naturally occurring with the nicotine. Sometimes a diluting agent is introduced into the above compound to dilute the same and bring its nicotine content to the above percentage.

It has been found that the above-mentioned natural resins extracted together with the nicotine alkaloid from the tobacco are somewhat beneficial in that they have in themselves some toxic and wetting actions.

From the above it is obvious that it is possible to use either the chemically pure nicotine a nicotine derivative of a higher fatty acid or the "Black leaf 50", since it is only necessary to use an equivalent amount to obtain the desired toxic action.

As an emulsifying agent of the soap type, one may use an alkali soap produced by the reaction of an alkali with a fatty acid. Thus it is possible to use sodium oleate. However, it is preferable to employ as an emulsifying agent a potassium oleate produced by the action of potassium hydroxide on oleic acid since the potassium oleate thus produced is more soluble in the compound than is the sodium oleate. The use of such an emulsifying agent also permits a decrease of the percentage of nicotine in the insecticide compound because the potassium oleate per se acts not only as an emulsifying agent but also has some penetrating as well as toxic qualities. Therefore, the use of potassium oleate or of a similar emulsifying agent permits the increase of the amount of spray oil in the compound. Sometimes, however, it is possible to dispense with the use of the above mentioned emulsifying agent because the nicotine oleate used in the manufacture of the insecticide has some emulsifying qualities.

The invention will be more fully appreciated from the following compositions, but it must be understood that these examples are only illustrative and that the proportions as well as the materials used may be somewhat changed without a material change in the results.

*Example I*

| | Volumes | Per cent |
|---|---|---|
| Pure nicotine | 10 | 5 |
| Mineral spray oil | 100 | 50 |
| Oleic acid | 45 | 22½ |
| Cyclohexanol | 20 | 10 |
| Sulfonated oleic acid | 10 | 5 |
| Potassium hydroxide (25 g./100 ml. water) | 15.5 | 7.5 |

*Example II*

| | Volumes |
|---|---|
| Black leaf 50 or tobacco juice | 20 |
| Mineral spray oil | 100 |
| Oleic acid | 43–47 |
| Sulfonated oleic acid | 10 |
| Potassium hydroxide 25 g./100 ml. water) | 15.5 |
| Secondary butyl alcohol | 25 |

*Example III*

| | Parts by weight |
|---|---|
| Black leaf 50 | 20 |
| Oleic acid | 25 |
| Mineral spray oil | 50 |
| Sulfonated olive oil | 20 |
| Secondary butyl alcohol | 20 |

It should be noted that the elimination of the hydroxide in Example III caused a fifty percent reduction in the amount of spray oil that could be effectively employed.

To prepare the first two above-described compositions the mineral spray oil, oleic acid, sulfonated oleic acid and cyclohexanol (or the equivalents of the last two substances) are first thoroughly mixed by agitation. The potassium hydroxide solution is then added slowly with rapid stirring. The resultant mixture is then warmed and agitated until complete solution is obtained. During this operation the temperature is not allowed to rise above 140° F. Thereafter, the mixture is cooled, and nicotine as the alkaloid, or as "Black leaf 50" is added, the compound being again stirred without heating until the nicotine is dissolved. The composition thus constituted produces a true and transparent solution. In use this composition is diluted with water in the proportion of about 1 to 4 ounces of the mixture or composition to 1 gallon of water, depending upon the type of pest to be combatted. Complete emulsification of the composition in water is readily effected by slight agitation. The emulsion thus produced is transparent, stable, and has an outstanding spreading and wetting action, thus causing the insecticide emulsion to be highly suited to spraying or otherwise applying to infested plants, etc.

Besides having dispersing and penetrating actions the mineral spray oil in the above-described insecticidal compounds also aids the destruction of insects and fungoid pests in that it helps to dissolve the waxy coatings thereon and permits the toxic agents to attack and kill such insects and fungoids, and also penetrates the trachea of insects and suffocates them.

As has been previously stated, the addition of the higher alcohols and of the sulfonated derivatives of the higher fatty acids produces transparent solutions having high dispersion qualities. However, if transparency and high dispersion, with the accompanying high degree of wetting, spreading, and/or penetration, are not required, an insecticide may be produced by using the above-described compounds or their equivalents without any addition thereto of the sulfonated oleic acid or of any other similar sulfonated fatty acid. Thus, the sulfonated oleic acid may be omitted from each of Examples I, II, and III. However, a compound not having this sulfonated acid produces only an average type of spray which is milky-white in color and does not spread particularly well. It is also to be noted that the amount of the sulfonated oleic acid has its critical range, below and above which the compound has some of the characteristics of an ordinary insecticide having less transparency and lower wetting and spreading qualities. It has been found that it is best to use from 4% to 6% by volume of sulfonated oleic acid calculated with respect to the volume of the insecticide compound. As stated above, other sulfonated derivatives of higher fatty acids may be used as substitutes for the above-described sulfonated oleic acid. Thus, sulfonated palmitic acid, sulfonated olive oil as well as sulfonated castor oil may be used.

For many purposes proportions of all ingredients may be varied over considerable ranges to produce insecticides of average, better than average and poorer than average quality. Such has been just described with respect to the sulfonated oleic acid. Similar variations of the other ingredients are possible. However, approximately the stated proportions should be employed for the superior qualities sought by the present invention.

It is to be understood that the above disclosures are not to be construed as limiting but merely as descriptive of the generic invention, since many variations may be made by those skilled in the art within the scope of the appended claims.

We claim:

1. A method of producing a transparent insecticide capable of ready emulsification with water, comprising the steps of thoroughly intermixing at ordinary temperatures a mineral spray oil, a higher fatty acid between about 4% and 6% by volume of the insecticide of a sulfonated fatty acid, and an alcohol of the class consisting of butyl alcohols, glycols, monomethyl, ethyl and butyl ethers of mono and di-ethylene glycols and cyclohexanol, adding slowly and with agitation a solution of an emulsifying agent, raising the temperature of the mixture to not exceeding approximately 140° F. during said last addition, cooling the obtained mixture, and finally adding thereto a nicotine compound.

2. A method of producing a transparent stable and highly dispersible insecticide comprising the intermixing at ordinary temperatures of mineral spray oil, oleic acid, sulfonated oleic acid and of cyclohexanol, the sulfonated oleic acid being in an amount between about 4% and 6% by volume of the insecticide, adding slowly and with vigorous agitation a solution of potassium hydroxide, heating the mixture during said addition to approximately 140° F., cooling the mixture, and finally incorporating thereinto at ordinary temperatures a toxicity producing agent of the class of nicotine.

3. An insecticide capable of producing a transparent emulsion with water containing mineral spray oil, nicotine oleate, potassium oleate, an alcohol of the class consisting of butyl alcohols, glycols, monomethyl, ethyl and butyl ethers of mono- and di-ethylene glycols and cyclohexanol, and an alkaline metal salt of sulfonated oleic acid in the order of about 4% to 6% by volume of the insecticide.

4. An insecticide capable of producing a transparent emulsion with water containing mineral spray oil, nicotine oleate, potassium oleate, cyclohexanol, and an alkaline metal salt of sulfonated oleic acid in the order of about 4% to 6% by volume of the insecticide.

5. An insecticide capable of producing a transparent emulsion with water containing mineral spray oil, nicotine oleate, potassium oleate, a secondary butyl alcohol, and an alkaline metal salt of sulfonated oleic acid in the order of about 4% to 6% by volume of the insecticide.

6. An insecticide capable of producing a transparent emulsion with water, comprising, by volume, approximately 5% of nicotine in oil-dispersible form, 50% of mineral spray oil, 22.5% of oleic acid, 10% of cyclohexanol, 5% of sulfonated oleic acid, and 7.5% of a solution of potassium hydroxide.

PAUL W. JEWEL.
WILLIAM E. BRADLEY.